United States Patent
Muñoz De La Torre Alonso et al.

(10) Patent No.: US 10,541,929 B2
(45) Date of Patent: Jan. 21, 2020

(54) PCC CONTROL OF HTTP ADAPTIVE BIT RATE VIDEO STREAMING PROTOCOLS

(71) Applicant: Telefonaktiebolaget LM Ericsson (publ), Stockholm (SE)

(72) Inventors: Miguel Angel Muñoz De La Torre Alonso, Madrid (ES); Veronica Sanchez Vega, Madrid (ES); John Woods, Madrid (ES)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/761,352

(22) PCT Filed: Sep. 29, 2015

(86) PCT No.: PCT/EP2015/072403
§ 371 (c)(1),
(2) Date: Mar. 19, 2018

(87) PCT Pub. No.: WO2017/054844
PCT Pub. Date: Apr. 6, 2017

(65) Prior Publication Data
US 2018/0270160 A1    Sep. 20, 2018

(51) Int. Cl.
*H04L 12/851* (2013.01)
*H04L 29/06* (2006.01)
(Continued)

(52) U.S. Cl.
CPC ...... *H04L 47/2483* (2013.01); *H04L 12/1407* (2013.01); *H04L 41/0893* (2013.01);
(Continued)

(58) Field of Classification Search
None
See application file for complete search history.

(56) References Cited

U.S. PATENT DOCUMENTS

2011/0082924 A1    4/2011    Gopalakrishnan
2011/0128907 A1*   6/2011    Kvernvik ............ H04L 12/5691
                                                        370/328
(Continued)

FOREIGN PATENT DOCUMENTS

WO    2013164017 A1    11/2013

OTHER PUBLICATIONS

International Search Report and Written Opinion dated May 30, 2016 for International Application No. PCT/EP2015/072403 filed on Sep. 29, 2015, consisting of 9-pages.
(Continued)

*Primary Examiner* — Michael J Moore, Jr.
(74) *Attorney, Agent, or Firm* — Christopher & Weisberg, P.A.

(57) ABSTRACT

PCC control of HTTP adaptive bit rate video streaming protocols. This PCC control is enforced in a network node that is in communication interaction with a user terminal, UE, and a media server, and is configured to: perform a deep packet inspection, DPI, on IP packets sent from the media server to the UE to detect an association between a plurality of identifiers and corresponding characteristics of respective different media streams representing the same media information; perform a DPI on IP packets sent from the UE to the media server to detect a media stream identifier selected by the UE from said association, the IP packets corresponding to a request to obtain one of the different media streams of the association; and modify the request by replacing the detected media stream identifier selected by the UE with any other of the media stream identifiers of the association.

25 Claims, 9 Drawing Sheets

(51) Int. Cl.
*H04L 12/14* (2006.01)
*H04L 12/24* (2006.01)
*H04W 28/02* (2009.01)
*H04L 29/08* (2006.01)

(52) U.S. Cl.
CPC .......... *H04L 65/4069* (2013.01); *H04L 65/80* (2013.01); *H04W 28/0215* (2013.01); *H04W 28/0268* (2013.01); *H04L 67/02* (2013.01)

(56) References Cited

U.S. PATENT DOCUMENTS

| | | | |
|---|---|---|---|
| 2012/0093054 A1* | 4/2012 | Liu | H04L 51/26 370/312 |
| 2013/0091526 A1* | 4/2013 | Iyer | H04L 65/608 725/62 |
| 2013/0212265 A1 | 8/2013 | Rubio Vidales et al. | |
| 2013/0254341 A1* | 9/2013 | Ramakrishnan | H04L 47/25 709/219 |
| 2014/0101118 A1* | 4/2014 | Dhanapal | H04N 21/251 707/695 |
| 2014/0169172 A1* | 6/2014 | Hu | H04W 28/18 370/236 |
| 2014/0254576 A1* | 9/2014 | Varma | H04W 48/16 370/338 |
| 2014/0365556 A1* | 12/2014 | Rehan | H04L 65/60 709/203 |
| 2015/0081851 A1* | 3/2015 | Oyman | H04W 74/0833 709/219 |
| 2016/0373324 A1* | 12/2016 | Gholmieh | H04L 65/4076 |

OTHER PUBLICATIONS

3GPP TS 26.247 V13.0.0; Title: "3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH)"; (Release 13), Dec. 2014, consisting of 119-pages.
GSM Association; Application Network Efficiency Task Force White Paper; Title: "Advancing 3GPP Networks: Optimisation and Overload Management Techniques to Support Smart Phones"; Version 1.0, Jun. 2012, consisting of 42-pages.
3GPP TS 23.303 V13.1.0; Title: "3rd Generation Partnership Project; Technical Specification Group Services and System Aspects; Proximity-based services (ProSe); Stage 2"; (Release 13), Sep. 2015, consisting of 116-pages.
3GPP TS 23.203 V13.1.0; Title: "3rd Generation Partnership Project; Technical Specification Group Services and System Aspects; Policy and charging control architecture"; (Release 13), Sep. 2014, consisting of 223-pages.
3GPP TS 29.212 V13.2.0; Title: "3rd Generation Partnership Project; Technical Specification Group Core Network and Terminals; Policy and Charging Control (PCC); Reference points"; (Release 13), Jun. 2015, consisting of 228-pages.

* cited by examiner (to be continued on FIG. 6B)

PCC CONTROL OF HTTP ADAPTIVE BIT RATE VIDEO STREAMING PROTOCOLS

CROSS-REFERENCE TO RELATED APPLICATIONS

This application is a Submission Under 35 U.S.C. § 371 for U.S. National Stage Patent Application of International Application Number: PCT/EP2015/072403, filed Sep. 29, 2015 entitled "PCC CONTROL OF HTTP ADAPTIVE BIT RATE VIDEO STREAMING PROTOCOLS," the entirety of which is incorporated herein by reference.

TECHNICAL FIELD

The present invention relates to a method and node for providing Policy and Charging Control (PCC) for HTTP adaptive bit rate video streaming protocols, as well as to a corresponding system and computer program.

BACKGROUND

With the new wireless devices (UE), e.g. smart phones, the network traffic has exploded creating a big challenge for the network operators. From all the services run by user terminals (UE), video streams make up one of the largest segments of data traffic in communications networks and it is expected to continue growing in the coming years.

The wireless device (UE) may be a device by which a subscriber may access services, applications, or the like, offered by an operator's network and services and applications outside the operator's network to which the operator's radio access network and the core network provide access, as, for example, access to the Internet. The UE may be any wireless device, mobile or stationary, that is enabled to communicate over a radio channel in the communications network, for example but not limited to a user equipment, mobile phone, smart phone, sensors, meters, vehicles, household appliances, medical appliances, media players, cameras, Machine to Machine (M2M) devices, smart watches, or any type of consumer electronics, for example, television, radio, lighting arrangements, tablet computer, laptops or personal computers. The wireless device may be portable, pocket storable, hand held, computer comprised or a vehicle mounted device, enabled to operate voice and/or data, via the radio access network, with an outer entity, such as another wireless device or a server.

Some years ago, the provisioning by telecommunication network operators of video services to user terminals (UE) subscribed to said operators was traditionally accomplished by so-called "walled garden" solutions, in which, in essence, these services were provided from servers under the domain of the network operator, and thus under its direct control. This trend has changed dramatically in recent years. Nowadays, most of the video services consumed by a user terminal, e.g. a mobile user terminal subscribed to a certain telecommunications network (operator) are provided by the, so-called, Over The Top service providers (OTT), which are independent of the telecommunications network operator to which the owner of the user terminal is subscribed, but which use the network infrastructure of network operators to provide services (e.g. video services) to the user terminal connected/subscribed to them. Examples of such OTTs are, e.g., YouTube or Netflix.

Presently, video services are generally delivered through a HTTP protocol (in contrast with other protocols like RTSP/RTP which are gradually declining). Within the HTTP protocol for video delivery, there is a trend of moving from HTTP Progressive Download (PDL) towards the more optimized HTTP Adaptive Bit Rate (ABR) streaming protocols, like: Apple HLS, Microsoft Smooth Streaming (MSS), Adobe HDS, DASH, or the like.

Network operators aim to minimize the impact of video traffic/streaming in their telecommunications networks. To avoid, for example, network congestion and/or overload situations due to the increased video traffic, different techniques are used today: trans-rating, trans-coding, video pacing, etc. For example, a video clip can be trans-rated from the original 1024 kbps to 300 kbps, which has negligible impact on the end-user experience on a small screen device.

HTTP ABR protocols natively support delivery optimization techniques which are directly handled by the end points (UE and HTTP server). Although the HTTP ABR protocols, such as mentioned above, have some differences, they have the following characteristics in common: Media streams (video streams) are prepared (e.g., encoded) beforehand by the media server, so that several video versions (e.g. with different encodings) of the same media stream (i.e. the same media stream content, the same media stream information) may be prepared, and are referenced by a "descriptor file", each version with its corresponding identifier (e.g., descriptors/locators (URL)). Then, (i) the server sends to the UE the "descriptor file" that defines the characteristics (e.g., format, encoding, duration . . . etc.) and a corresponding identifier (e.g., descriptor/locators (URL)) of different media streams that represent the same media information (i.e. the same video, but with respectively different quality characteristics for example), and (ii) the user terminal (UE) selecting—by the own criteria of the UE (e.g., the UE's own processing load, the UE's perceived/detected bandwidth, etc.)—one of the media stream identifications, for example one of the descriptors/resource locators (URL) contained in the received "descriptor file". This procedure defines a UE controlled manner for downloading media via a telecommunications network.

In other words, before the actual video delivery takes place, the HTTP video server sends to the UE a "descriptor file" that defines the characteristics (format, encoding, duration . . . etc.) and descriptors/locators (URL) of the different media streams that represent e.g. the same media information (i.e. each with a different characteristics). Subsequently, the UE parses the descriptor file and selects the video characteristics (format, encoding, etc.) and, for example, the URL including the corresponding media streams based on network conditions (i.e. as perceived by the UE) and/or the terminal characteristics. The above is selected before actual video delivery and may also be dynamically changed during the video session, so that e.g. the video quality may degrade gracefully when the UE cannot keep up with higher bitrates for any reason (e.g. the transmission resources of the network are overloaded and cannot provide enough bandwidth to the UE, and/or the processing or playing resources of the UE are overloaded).

3GPP TS 26.247 (V13.0.0) defines details of the aforementioned DASH protocol. More precisely, in chapter 10 (titled "QoE for Progressive Download and DASH") a mechanism is defined for UE to deliver QoE reports for video delivered through DASH protocol to the web server.

Communications networks supporting the 3GPP TS 23.303 (V13.1.0) Policy and Charging Control architecture (PCC) are able to handle video services QoS and attempt to avoid network congestion and/or overload situations by establishing policies for video services where dedicated bearers with QoS are established. While video streaming over dedicated bearers with guaranteed bit rates are unlikely to suffer from congestion, video services used over the top may not be mapped onto dedicated radio bearers but are rather mapped to best effort radio bearers. In that case, video clients may compete for the same resources and also compete with other traffic (e.g., FTP, Web). Hence, congestion may occur which degrades QoS.

The PCC architecture that supports Policy and Charging Control functionality is illustrated in FIG. 1. This Figure has been taken from TS 23.203 (V13.1.0), which specifies the PCC functionality for Evolved 3GPP Packet Switched domain, including both 3GPP accesses (GERAN/UTRAN/E-UTRAN) and Non-3GPP accesses. More specifically, FIG. 1 shows the following relevant elements:

1) A PCRF (Policy and Charging Rules Function) node is a functional element that performs policy control decision and flow based charging control. A node implementing a PCRF provides network control regarding the service data flow detection, gating, QoS and flow based charging (except credit management) towards the PCEF node 20 (described later).

2) A SPR (Subscriber Profile Repository) node is a functional element that contains all subscriber/subscription related information for the subscribers of a network operator. The information is needed—among other purposes—for determining subscription-based policies and IP-CAN bearer level PCC and/or application detection control (ADC) rules by the PCRF. The SPR node 50 may be implemented by a single node, or their functionality may be distributed among a plurality of nodes (e.g. a distributed database system).

3) A PCEF (Policy and Charging Enforcement Function) node that encompasses service data flow detection, policy enforcement and flow based charging functionalities. The PCEF functionality is commonly implemented by nodes interposed in the routing path of the data IP packets sent to and/or received from UEs connected to a telecommunications network (examples of said kind of nodes are: "Gateway GPRS Support Nodes"-GGSN-, or "Packet Data Network-Gateways"-PDN-GW-).

4) A TDF (Traffic Detection Function) node is a stand-alone deep packet inspection (DPI) node introduced in 3GPP Rel11. In short, a TDF node handles application traffic detection, as per request from the PCRF node, as well as reports about the detected application traffic along with service data flow descriptions, if deducible, to the PCRF node, if requested by the PCRF node. Here, in addition to the IP header, the—as such known—DPI technology may also examine the data (payload) part of an IP packet as it passes an inspection/interception point to decide whether the packet may pass, needs to be routed to a different destination, for the purpose of collecting/detecting information or the like. In particular, DPI comprises inspecting/analyzing the contents of the IP data packets beyond the—so called—IP 5 tuples. The IP 5 tuples consist on the heading elements of an IP data packet comprising: IP source address, IP destination address, source transport address, destination transport address, and protocol over IP (e.g. TCP, UDP, SCTP). Therefore, the DPI technology consists, in short, in inspecting and analyzing the application layer information conveyed by IP data packets. As a result of the DPI analysis, service classification information may be obtained, which consists on IP packets being classified—i.e. after DPI processing—according to a configured tree of rules so that they are assigned to a particular service session.

5) The Gx reference point is defined in 3GPP TS 29.212 (V13.2.0) and lies between the PCRF node and the PCEF node. The Sd reference point (Sd) is defined in 3GPP TS 29.212 (V13.2.0) and lies between the PCRF node and the TDF node.

TECHNICAL PROBLEMS WITH EXISTING SOLUTIONS

The UE controlled manner for downloading media via a telecommunication network, as described above, escapes the control of the operator of the communications network and therefore leads to congestions problems that a telecommunications network may experience due to uncontrolled video services demanded by user terminals (UE). Therefore, in the case of video delivery over HTTP ABR protocols, the operator of the telecommunications network has no control over the video characteristics (e.g., format, encoding, bandwidth, aspect ratio, display size, etc.), as it is the UE that directly chooses/selects between the different options offered by the video streaming server (i.e. as defined by the "descriptor file").

The same applies for the QoE metrics reporting for the DASH video protocol. This is controlled today by the DASH video server but is not under operator's control.

The following describes an example of the UE controlled manner for downloading media via a telecommunication network based on an Apple HLS descriptor file:

EXTM3U
EXT-X-STREAM-INF:PROGRAM-ID=1,BAND-
  WIDTH=1280000
http://example.com/low.m3u8
EXT-X-STREAM-INF:PROGRAM-ID=1,BAND-
  WIDTH=2560000
http://example.com/mid.m3u8
EXT-X-STREAM-INF:PROGRAM-ID=1,BAND-
  WIDTH=7680000
http://example.com/hi.m3u8
EXT-X-STREAM-INF:PROGRAM-
  ID=1,BANDWIDTH=65000,CODECS="mp4a.40.5"
http://example.com/audio-only.m3u8 indicating a plurality of video stream identifiers (here, resource locator identifier (URL) such as http://example.com/low.m3u8) and a corresponding characteristics (here, a bandwidth such as BANDWIDTH=1280000).

In this case, the UE is free to select the highest quality video format (http://example.com/hi.m3u8) and it is not possible for the network operator to force the UE to select another lower quality format, e.g. in case the network is congested, overload situations occur, or in case the user has no Video Premium package.

In order to provide a network operator control for downloading media via a telecommunication network, the prior art reference 1 (GSMA White Paper "Advancing 3GPP Networks: Optimisation and Overload Management Techniques to Support Smart Phones", (http://www.gsma.com/newsroom/wp-content/uploads/2013/02/Opt-Overload-Man-Tech-Support-Smart-Phones.pdf), Section "VS-14") envisages a concept wherein the "descriptor file" is modified on-the-fly by an intermediate node of the network operator, e.g. by a network node such as the PCEF node or the TDF node having a communication interaction capability with both the UE and the (OTT) media server.

For example, in the case the subscriber is not a Premium subscriber, the PCEF/TDF node could modify the original Apple HLS descriptor file described above as follows (in this case, by removing the high quality video format):

EXTM3U
EXT-X-STREAM-INF:PROGRAM-ID=1,BAND-
   WIDTH=1280000
http://example.com/low.m3u8
EXT-X-STREAM-INF:PROGRAM-ID=1,BAND-
   WIDTH=2560000
http://example.com/mid.m3u8
(#EXT-X-STREAM-INF:PROGRAM-ID=1, BAND-
   WITH=7680000) <-- FORMAT REMOVED
(http://example.com/hi.m3u8) <-- LINK REMOVED
EXT-X-STREAM-INF:PROGRAM-
   ID=1,BANDWIDTH=65000,CODECS="mp4a.40.5"
http://example.com/audio-only.m3u8

By contrast, in case the subscriber is a Premium subscriber (e.g. with the Video Premium package), the PCEF/TDF node may either (i) leave the original Apple HLS descriptor file unmodified, or, (ii) modify the original Apple HLS descriptor file as follows (in this case, by removing the low quality video formats):

EXTM3U
(#EXT-X-STREAM-INF:PROGRAM-ID=1,BAND-
   WITH=1280000) <-- FORMAT REMOVED
(http://example.com/low.m3u8) <--LINK REMOVED
EXT-X-STREAM-INF:PROGRAM-ID=1,BAND-
   WIDTH=2560000
http://example.com/mid.m3u8
EXT-X-STREAM-INF:PROGRAM-ID=1,BAND-
   WIDTH=7680000
http://example.com/hi.m3u8
EXT-X-STREAM-INF:PROGRAM-
   (ID=1,BANDWITH=65,000,CODECS="mp4a.40.5")
   <-- FORMAT REMOVED
http://example.com/audio-only.m3u8       <-- LINK
   REMOVED This requires, however, servers with complex proxy capabilities. This is not feasible in most scenarios for the reason that the descriptor file is delivered over HTTP/TCP and therefore, in most cases, it comes split into different internet protocol, IP, packets (so the streaming server waits until TCP ACK message from UE before delivering the next descriptor packet). Additionally, and due to similar reasons, when the descriptor file is compressed (e.g. with gzip) it is not feasible to uncompress it, modify it and compress it again at the intermediate node. A solution to the above would require, for example, a PCEF/TDF node to behave as a TCP proxy, which is complex to implement, and may also imply a higher latency in video playback. Moreover, the descriptor file can be encrypted in some cases, which would make its modification even more technically complex (e.g. even by the eventual proxy-enhanced PCEF/TDF commented above) before sending the resulting modified descriptor file to the destination UE.

As such, there is a need of a less technically complex mechanisms in order to bring the operator of the telecommunications network in a position to control the network resources that are devoted to provide video services to UEs, and to thereby control and limit the bandwidth demanded by some services as demanded by their users via their UEs, and, thus, to allow a better control of network resources to prevent congestion on access and/or transmission resources of the telecommunications network, in particular in the case of HTTP ABR protocols.

SUMMARY

Accordingly, it is an object of the present invention to solve the above described problems. In particular, it is an object of the present invention to provide a PCC control of HTTP Adaptive Bit Rate video streaming protocols. A suitable method, a network node, a system and a computer program are defined in the independent claims. Advantageous embodiments are defined in the dependent claims.

In particular, for overcoming the problems mentioned described above, the descriptor file itself, as originally received from a server towards the UE, is not modified. Instead, the request from the UE for a particular media stream is modified by replacing a media stream identifier (e.g., the requested URL in a HTTP GET message(s)) for the media streams that is (are) subsequently sent from the UE (i.e. subsequently sent by the UE after it has received the corresponding/original descriptor file).

In one embodiment, a method in a network node being in communication interaction with a user terminal, UE, and a media server, comprises the steps of: performing a deep packet inspection, DPI, on IP packets sent from the media server to the UE to detect an association between a plurality of identifiers and corresponding characteristics of respective different media streams representing the same media information; performing a DPI on IP packets sent from the UE to the media server to detect a media stream identifier selected by the UE from said association, the IP packets corresponding to a request to obtain one of the different media streams of the association; and modifying the request by replacing the detected media stream identifier selected by the UE with any other of the media stream identifiers of the association.

In further embodiments, a corresponding network node and a corresponding system is provided. In still another embodiment, a corresponding computer program is provided which includes instructions configured, when executed on a single or a plurality of data processors, to cause the single or the plurality of data processors to carry out the above-described method.

The proposed mechanism allows the network operator to directly control the HTTP ABR video delivery formats according to operator's policies (e.g. screen size based on IMEI, subscriber type, congestion state, geographical location, etc.), resulting in offering both the best available video QoE (based on, e.g., network congestion state, the user subscription, etc.) and efficiently managing the video traffic growth in an operator network. It may also allow the network operator to directly control the UE QoE reports, for example for the DASH video protocol.

BRIEF DESCRIPTION OF THE DRAWINGS

The embodiments herein will now be further described in more detail in the following detailed description by reference to the appended drawings illustrating the embodiments and in which.

DESCRIPTION OF THE EMBODIMENTS

Figure 1:
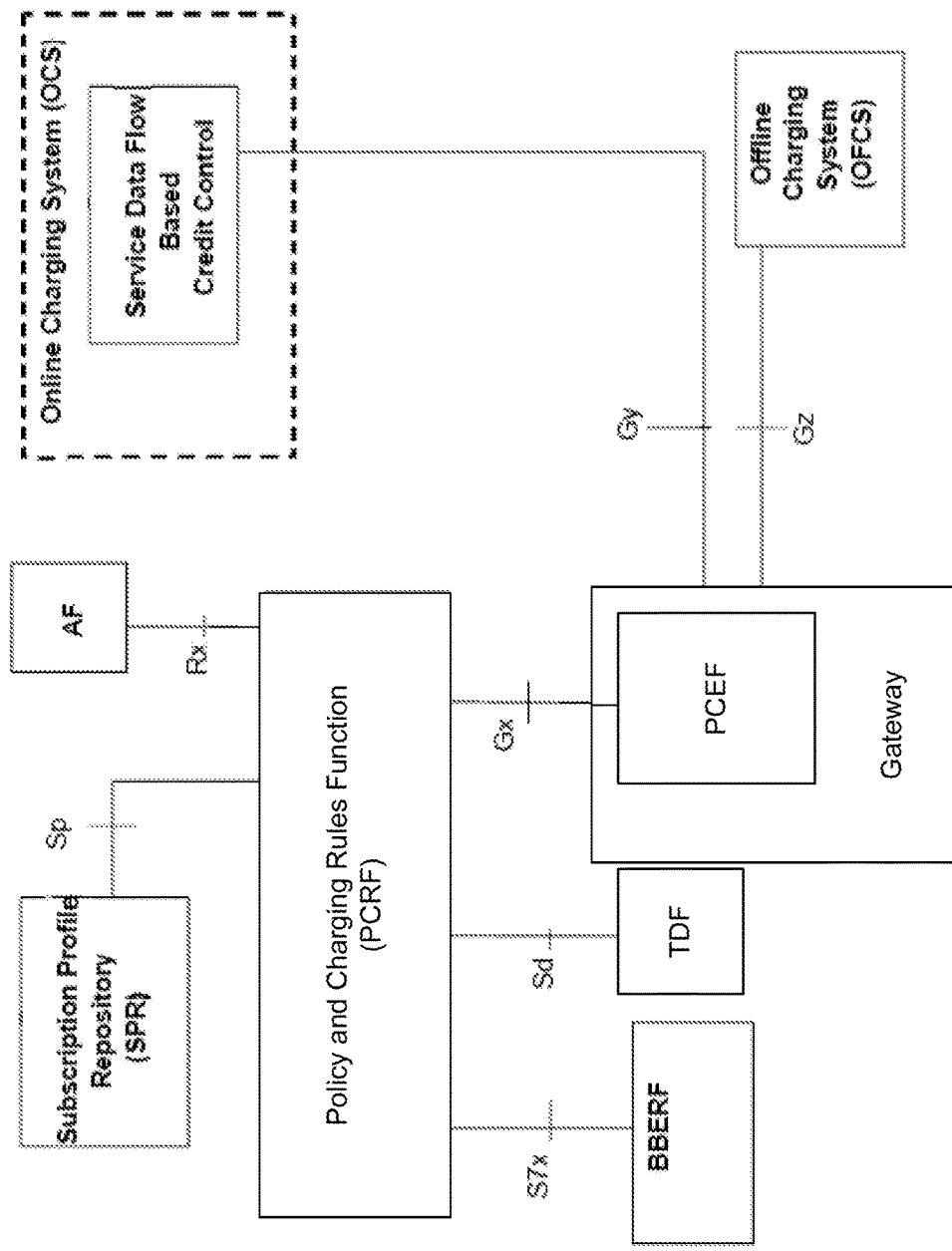
FIG. 1 is a schematic block diagram illustrating a Policy and Charging Control (PCC) Architecture in 3GPP.

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

The following a mechanism is described to address the trade-off between offering the best video QoE (e.g., based on the user subscription) and managing video traffic growth for the case of emerging HTTP ABR video streaming delivery protocols.

The proposed mechanism enables a network operator's control (based on PCRF policies through PCC rules) for the selection of the media streams in the different HTTP ABR video delivery protocols, by means of, first, a DPI-based detection of a content of the descriptor file sent from the media server towards the UE, followed by a DPI-based detection and modification—if considered to be necessary by the network control—of the requested media stream identifier (e.g., requested URL/s) for the media streams that are subsequently sent by the UE for obtaining the corresponding media stream/s.

The proposed mechanism is based on a PCEF/TDF network node detecting by means of, as such known, DPI techniques the HTTP ABR descriptor file and its content, and by subsequently using DPI techniques for detecting and modifying the corresponding requested media stream identifier (e.g., URL/s) for the media streams subsequently sent from the UE, according to different network policies (e.g., UE screen size based on IMEI, subscriber type, network congestion state, user equipment location, etc.) in order to deliver the video stream to the UE in the most appropriate media stream format. It is noted that the DPI techniques here refer both to L7 DPI (HTTP, e.g. to inspect the URL field) and L7+ DPI (HTTP payload, e.g. to inspect the descriptor file). In this context, it is also proposed to use PCC policies to obtain the UE screen size based on a PCRF node access to an IMEI Database and to select the appropriate media type for the different HTTP ABR video streaming protocols. As an example, in the case of DASH video streaming protocol, each available media type (or video representation) is included in the descriptor file together with the corresponding width and height fields, so the most suitable media type can be selected based on comparing these two fields with the UE screen size (obtained by the aforementioned method).

In order to overcome the technical problems mentioned in the previous section with regard to the on-the-fly concept, it is proposed here not to modify the "descriptor file" as originally received from a media server towards the UE, and, to instead modify the requested media stream identifier, for example the URL in the HTTP GET message(s) for the media streams that is(are) subsequently sent from the UE, i.e. subsequently sent by the UE after it has received the corresponding/original "descriptor file". Here, the URL is a field included in the HTTP header, not in the HTTP payload.

In addition, a mechanism is proposed to enable the network operator's control of UE QoE metrics reporting, for example for the DASH video protocol.

Figure 2:
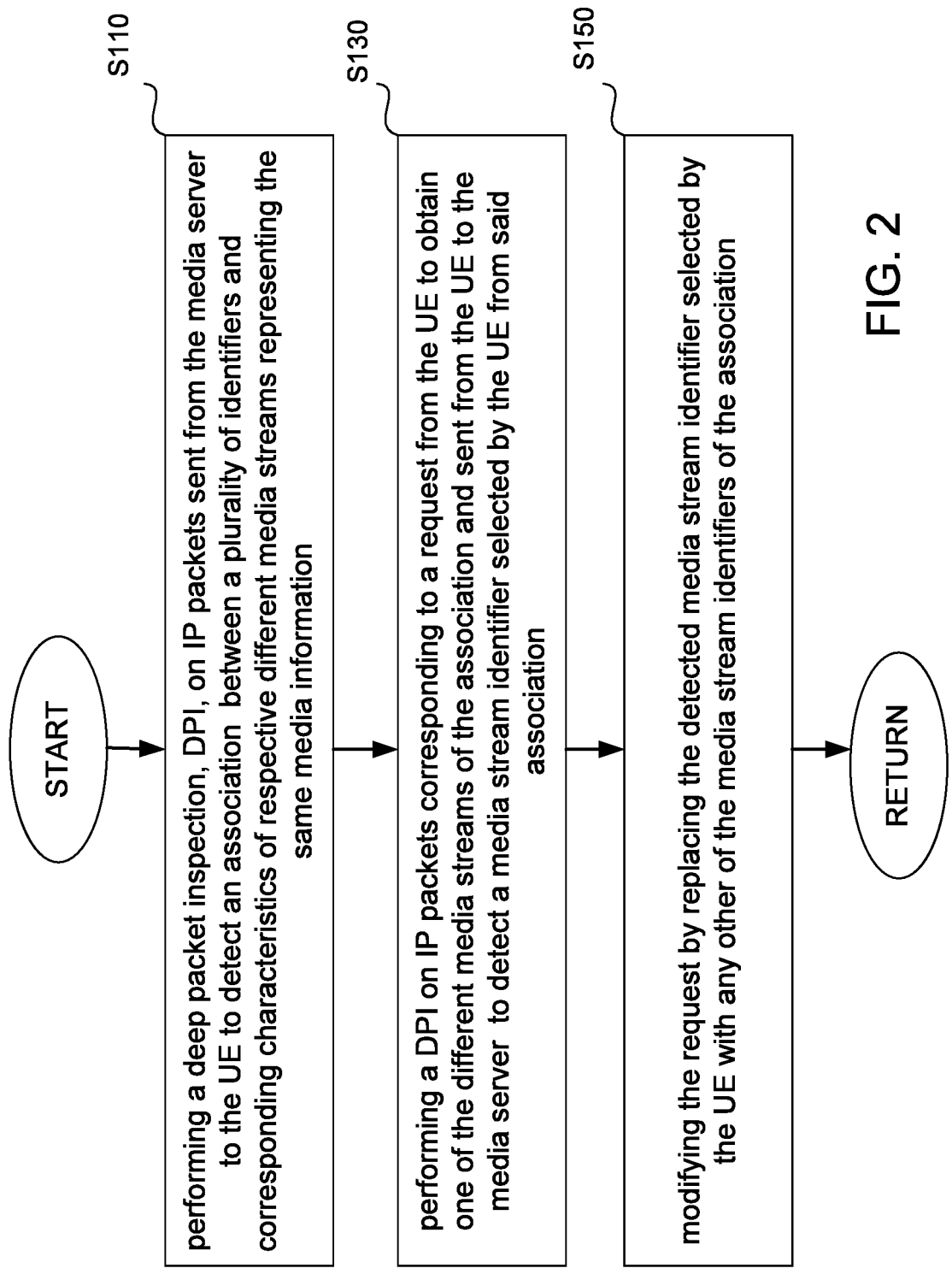
FIG. 2 is a schematic flow diagram illustrating an embodiment of a method at a network node.
Figure 3:
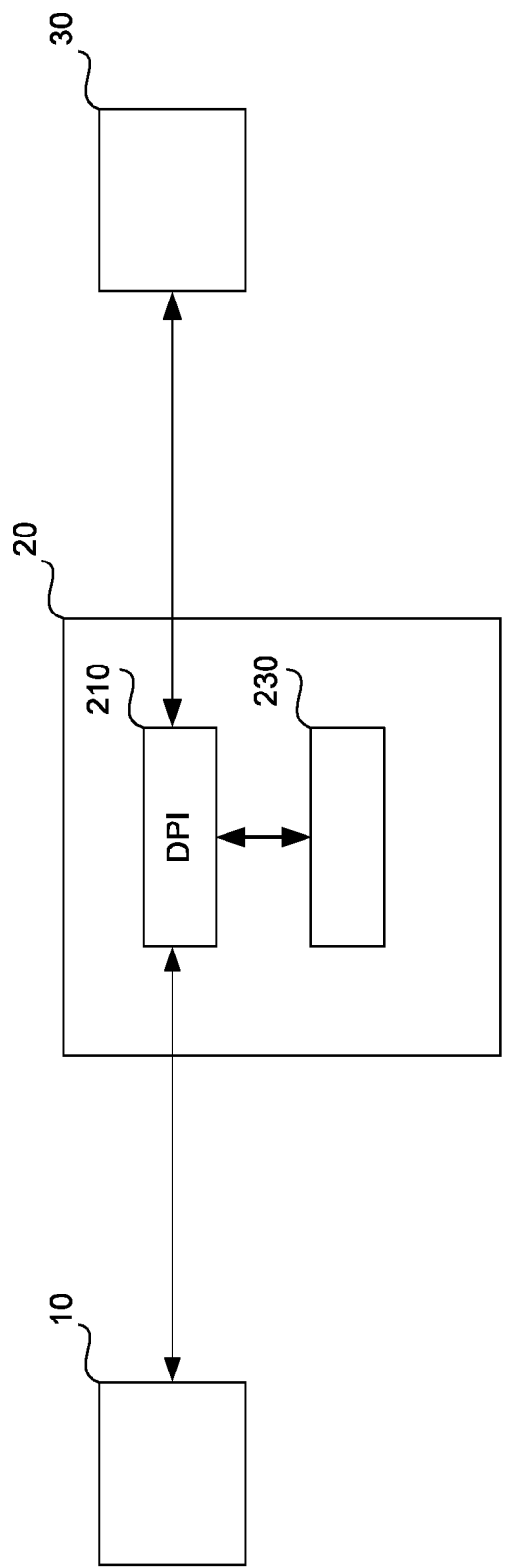
FIG. 3 is a schematic diagram illustrating an embodiment of a network node.

FIG. 2 is a schematic flow diagram illustrating an embodiment of a method at a network node 20 which is further illustrated in FIG. 3. According to the embodiment, the network node 20 is provided in a telecommunications network which comprises the PCC control architecture as illustrated in FIG. 1. As illustrated in FIG. 3, the network node 20 is interposed between the media server 30 and the UE 10. The media server 30 may be an OTT media server, as described above, and may provide video streaming services according to a HTTP ABR video streaming protocol. The network node 20 may thus enable a communication interaction with the UE 10 and the media server 30 to exchange signaling and/or data messages, for example using Internet Protocol (IP) packets (IPv4 packets, IPv6 packets) being, in generally, composed of a header and a payload. As further illustrated in FIG. 3, the network node 20 comprises a communication module 210 that is configured to receive and sent IP packets, and that is also configured to intercept/monitor IP packets being transmitted between the UE 10 and the media server 30. The network node 20 further comprises a processing module 230 that is configured to perform a processing with regard to the IP packets, as will be further described below.

In particular, according to Step S110 in FIG. 2 the communication module 210 of the network node 20 performs a deep packet inspection, DPI, on IP packets that are sent from the media server 30 to the UE 10. The DPI inspection is performed in order to detect the content of a "descriptor file" according to the used HTTP ABR video streaming protocol, i.e. to identify and analyse the contents of the "descriptor file" sent from the media server 30 to the UE 10, in particular to detect an association between a plurality of identifiers (e.g. media steam resource locations (URL), media stream descriptors, and the like) and corresponding characteristics (e.g. media steam format, encoding, duration, and the like) of respective different media streams representing the same media information, i.e. the same media (video) content. As explained above, the media server 30 may provide a plurality of different media streams having different characteristics, for example quality characteristics/representations, for the same video content. Each of the plurality of respective media streams is identified in the association (in the "descriptor file") by a corresponding media stream identifier, which may be a resource location (URL) or the like. As will be described further below, said resource location may be conveyed in a subsequent request from the UE 10 to the media server 30. Such a detected association may be (temporarily) stored in an internal or external storage module (not shown) of the network node 20.

According to Step S130 in FIG. 2 the communication module 210 of the network node 20 subsequently performs a DPI on IP packets that correspond to a request that is sent from the UE 10. An example of this request is a HTTP GET request message which contains the URL field pointing to the specific media stream requested by the UE (as will be further described below).

Here, the request is for obtaining one of the different media streams as defined in the association which was detected in Step S110 and is sent from the UE 10 to the media server 30. The subsequent DPI is performed in order to detect a media stream identifier that is selected by the UE 10 from the received association (in the "descriptor file").

According to Step S150 in FIG. 2 the processing module 230 of the network node 20 interacts with the communication module 210 to further modify the (inspected) request by replacing the detected media stream identifier that is selected by the UE 10 and is included in the request with any other of the media stream identifiers of the association. In other words, the request of the UE 10 is modified by the network node 20 to identify a different one of the corresponding media streams having a different characteristic. For example, if the detected media stream identifier defines a resource location (URL), then the network node 20 may replace the detected URL by any other URL that is defined in the association and conveyed by the "descriptor file". This modified request is sent by the communication module 210 to the media server 30.

This mechanism therefore enables a control for the operator of the telecommunications network over the video characteristics (e.g., format, encoding, bandwidth, aspect ratio, display size, etc.) that is provided to a UE 10, even though the UE chooses/selects between the different options offered by the video streaming server (i.e. as defined by the "descriptor file"). In particular, this control is provided by a network-enabled modification ("overwriting") of the UE request.

In contrast to the above described embodiment, the prior art either relies on solutions wherein the UE is making the decision as to which media stream (e.g. which URL/format) to select from the different media streams described by the "descriptor file" and thus (completely) escapes the control of the operator of the network, or modifies the "descriptor file" itself which, however, requires servers with complex proxy capabilities.

In a further embodiment, the modifying step S150 may be performed based on policies configured in the network node 20, or received in the network node 20 from a PCRF node 40 of the PCC architecture. More specifically, the policies may be pre-configured (static) policies that are provided in the network node 20, or may be received, via the communication module 210, from the PCRF node. Based on the latter option, the applied policies may be (dynamically) updated, for example to account for updates in the overall telecommunication network that affect the network traffic (and therefore the network congestion states), or to account for updates in the subscriber profile.

Moreover, the modifying step S150 may be conducted if the detected media stream identifier selected by the UE 10 and included in the request does not match with a specific media stream identifier as indicated based on the policies. Here, the policies may comprise a policy and charging control, PCC, rule or an application detection and control, ADC, rule. Specifically, the detected media stream identifier corresponds, via the defined association, to a particular characteristic of a media stream, for example a media stream for a particular UE screen size, a media stream requiring a particular bandwidth or the like. The policies, on the other hand, indicate/define a UE-specific media stream characteristic that is to be used when streaming a video. For example, the policies may indicate that the UE 10 has a specific screen size. Here, the UE screen size may be retrieved via a PCRF node access to an external database that stores information, such as the UE screen size (screen width, screen height) in relationship with the international mobile equipment identity, IMEI, of the UE 10. For example, as will be further described below, in the context of an IP-CAN session establishment for the UE 10 and providing PCC rules at the PCEF node 20 based on the subscriber profile, the PCRF node may additionally perform a database query to an IMEI database to retrieve the UE screen size.

Based on the above, the network node 20 may compare the particular characteristic of a media stream, as indicated by the detected media stream identifier, with the specific characteristic of the media stream, as required by the policies, and may replace the detected media stream identifier in the request with a specific media stream identifier (corresponding to the specific characteristic of the media stream, as required by the policies) if there is no matching. Such a replacement of the media stream identifier is therefore performed in the network node, if the UE 10 selects a media stream that is not suitable for the UE 10 screen size and would therefore lead to network data traffic that is higher than necessary.

Besides the above described example of policies being described with regard to the UE screen size, the policies may also be defined with regard to network congestion status information, a UE location, and/or a subscriber type. For example, the network congestion status information may be dynamic information defining thresholds, for example with regard to a currently usable bandwidth. Further, the location of the UE 10 may indicate a specific network coverage in a geographical area/region which may defines limits with regard to the media stream characteristics that should be used by the UE 10.

Figure 4:
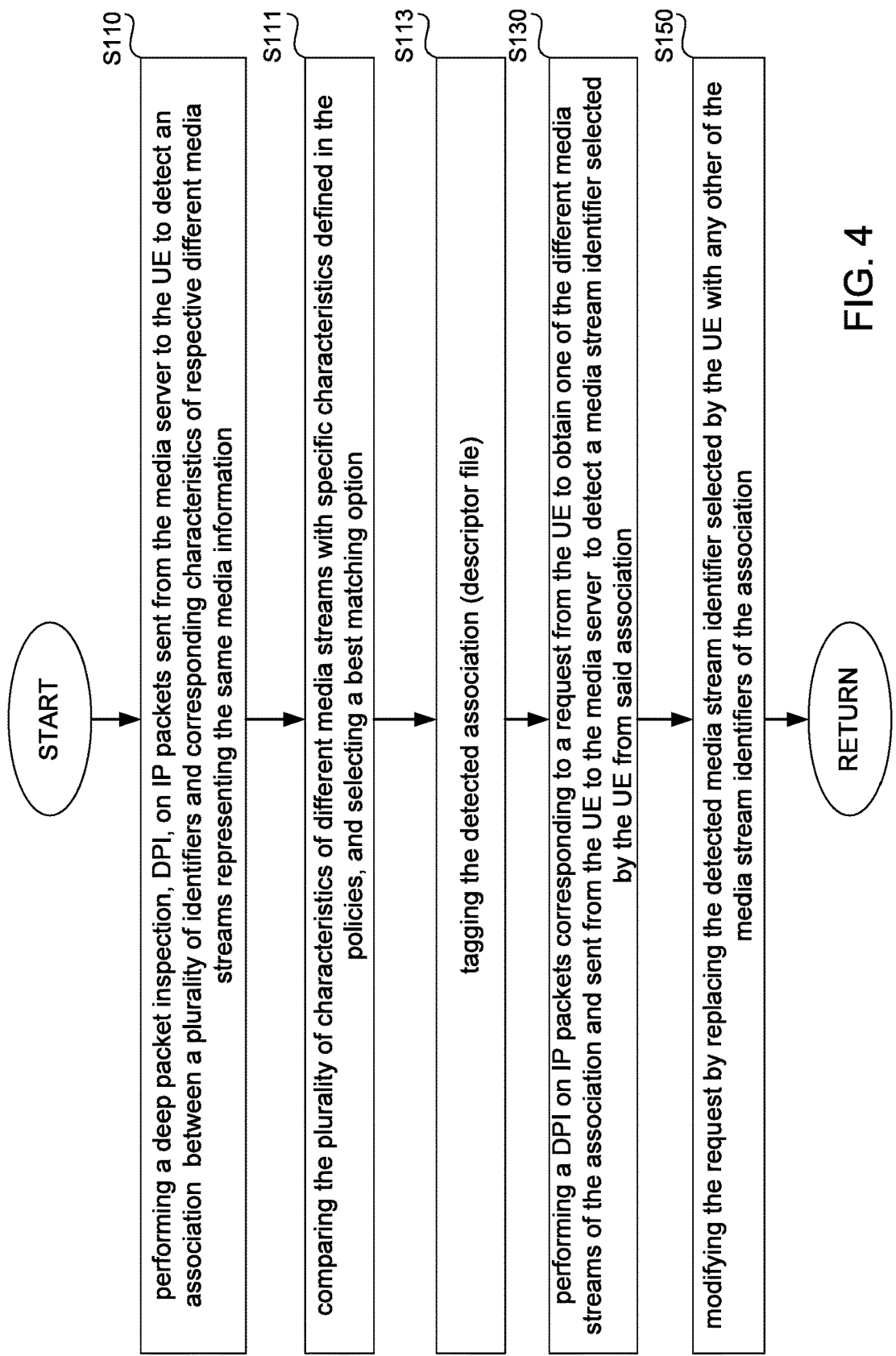
FIG. 4 is a schematic flow diagram illustrating another embodiment of a method at a network node.

FIG. 4 is a schematic flow diagram illustrating an embodiment of a method at the network node 20. Steps S110, S130, and S150 have already been described above with regard to FIG. 2. In addition, the detection of the association in Step S110 may be performed by identifying, using DPI, the descriptor file, as for example included in a HTTP 200 OK response message from the media server 30 (as will be described below), and by parsing the descriptor file for detecting the plurality of characteristics (characteristics of the UE device, such as screen width, screen height, characteristics of the network, such as codecs, bandwidths) and corresponding identifiers for the association. Subsequently, the detected plurality of characteristics in the descriptor file may be compared in Step S111 with a specific characteristic defined in the policies (as described above), and selecting a best matching option in the association ("descriptor file"). Here, the best matching option, for example, a UE screen size of width=400, height=224 (as further described below) may be used in step S113 to tag the detected association. In particular, the plurality of characteristics in the association may be tagged as either matching the policies or not matching the policies. As such, the matched media stream characteristic thus defines the specific media stream identifier (specific URL, for example) that is to be used when modifying the request in step S150.

Figure 5:
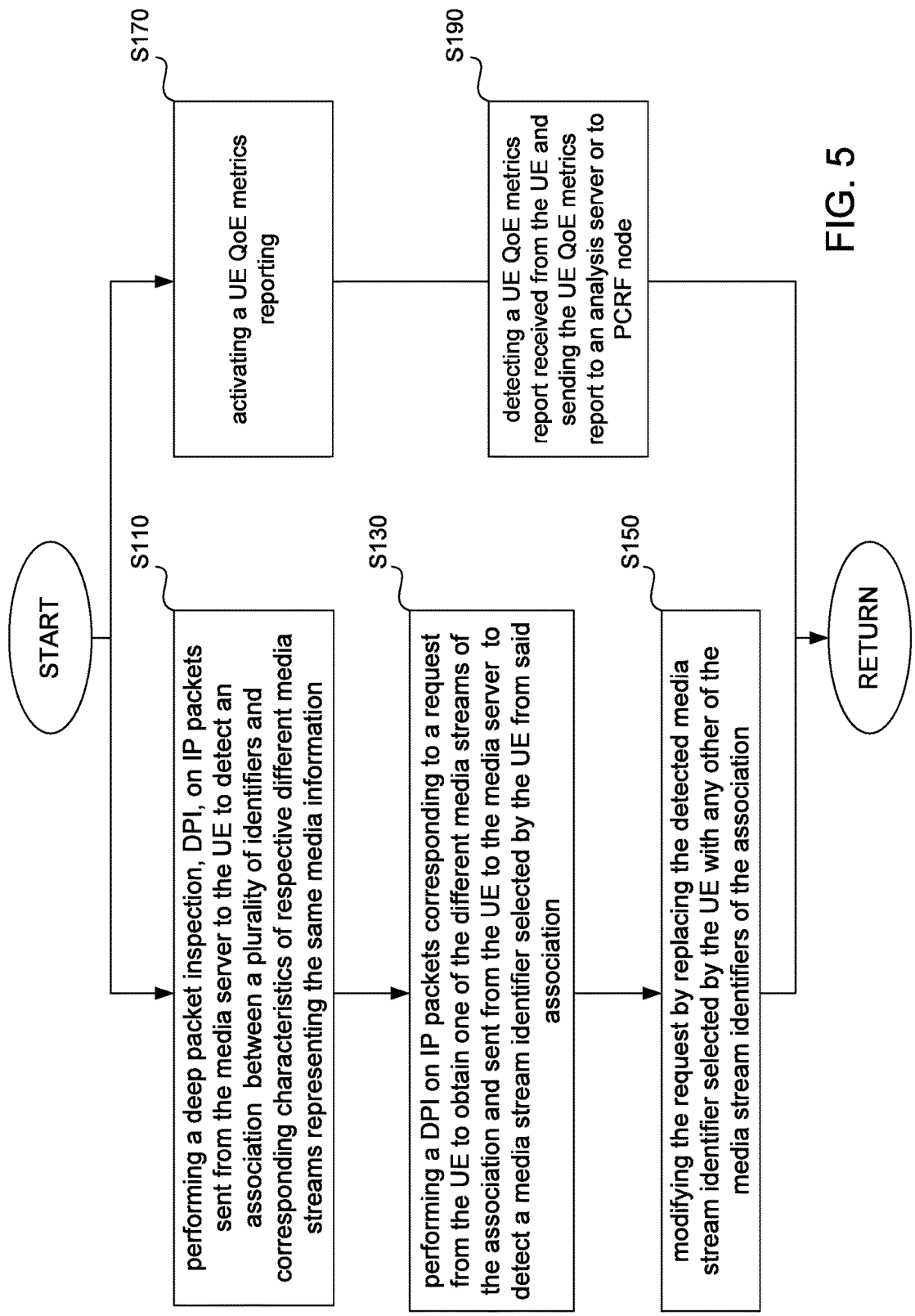
FIG. 5 is a schematic flow diagram illustrating another embodiment of a method at a network node.

FIG. 5 is a schematic flow diagram illustrating another embodiment of a method at a network node. In parallel to the method steps described above, or independently to the method steps described above, the network node 20 may further perform a step S170 in which a UE QoE metrics reporting is activated. This may be achieved at the network node 20 by detecting the descriptor file based on DPI, as described above, and by inserting, via the processing module 230, a "metrics" tag and specific metrics of interest (e.g. throughput, number of changes of video representation, buffer delay, and the like) into the descriptor file. Additionally, a URL of an external analytics server may be added to the descriptor file in order to force the UE 10 to send the QoE metric reports directly to the analytics server. Here, the "metrics" tag and the specific metrics of interest may be indicated by a corresponding PCC rule, as received from a PCRF node. The UE 10 will subsequently retrieve the modified descriptor file and active the QoE metrics reporting, in particular, configure a QoE reporting interval. In step S190, the communication module 210 of the network node 20 detects a UE QoE metrics report, for example as part of a HTTP POST message, that is sent by the UE 10, and sends the UE QoE metrics report to an external analytics server or to the PCRF node, preferably pre-processed, e.g. only when a certain QoE metric is below a configured threshold.

In the following a further embodiment is described for the scenario of the network node 20 being a PCEF node with DPI capabilities. This scenario equally applies for the network node 20 being a TDF node. More specifically, FIGS. 6A and 6B (continuation) illustrates a flow diagram used in a communications network comprising a UE 10, a PCED node (with DPI capabilities) 20, a PCRF node 40, a SPR node 50, an IMEI database 60, and a HTTP video server 30 which are in communication interaction to implement this scenario, in which it is further assumed that the subscriber is not a Premium subscriber.

Figure 6A:
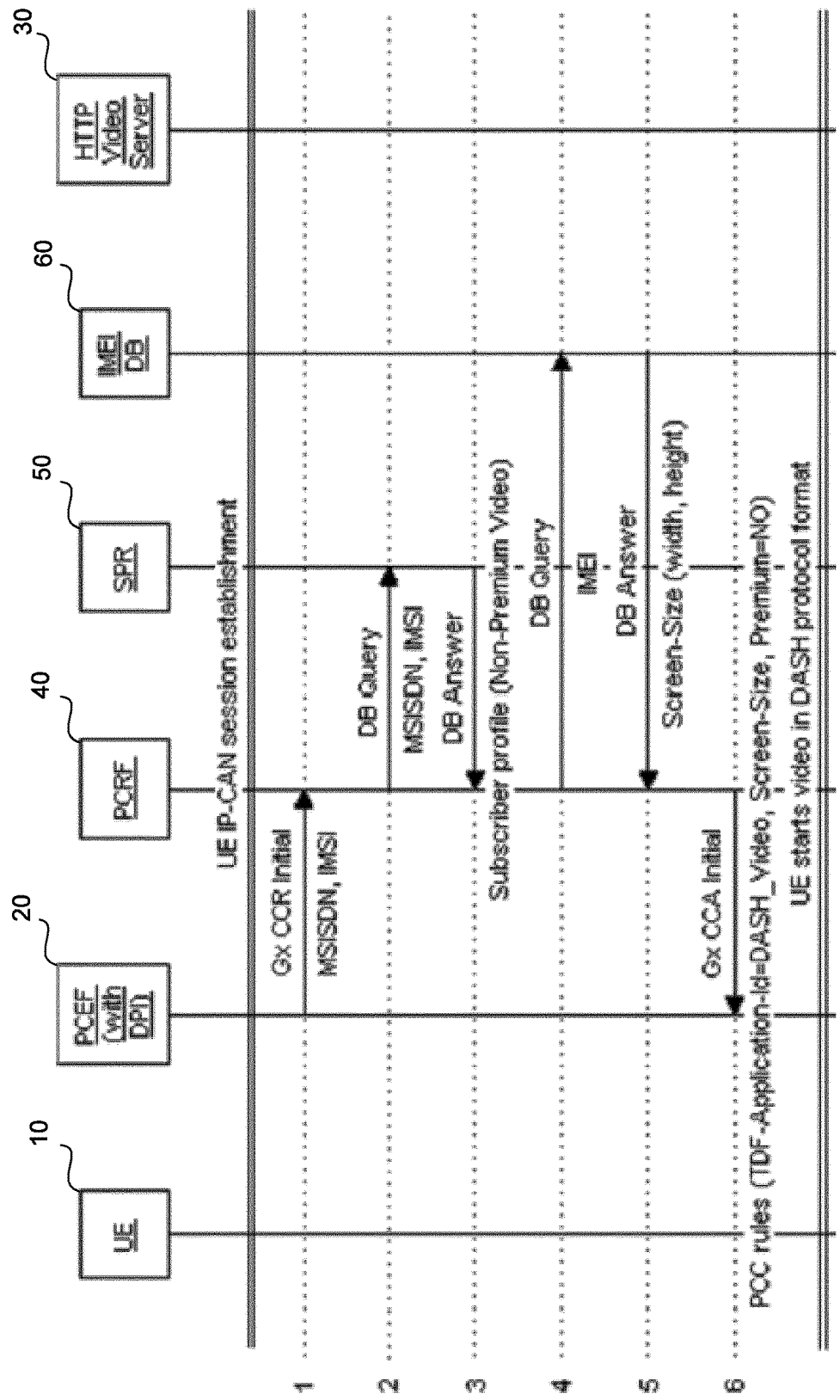
FIGS. 6A and 6B (continuation) is a schematic flow diagram illustrating another embodiment of a method in a communications network.

In Step 1 of FIG. 6A, at IP-CAN session establishment (PDP context creation here, in case of 3G networks), the PCEF node 20 (e.g. a GGSN node) will convey to the PCRF node 40 the subscriber identity (IMSI or MSISDN) in the Gx initial CCR message.

According to Steps 2 and 3 of FIG. 6A, based on the received subscriber identity (IMSI or MSISDN) in Step 1, the PCRF node 40 will perform a query to retrieve the subscriber's profile from a SPR database (DB) 50, which in this case indicates this is not a Premium Video subscriber.

Subsequently, according to Steps 4 and 5 of FIG. 6A, based on the received UE device IMEI which identifies the device (UE), the PCRF node 40 will retrieve a corresponding screen size of the UE 10 by means of a query to an external IMEI database 60, which in this case returns, for example, a small UE screen size (width="400", height="224").

According to Step 6 of FIG. 6A, the PCRF node 40 uses a Gx initial CCA message to install in the PCEF node 20 the corresponding PCC rules, specifically the PCC rule for HTTP ABR video (DASH protocol in the present embodiment), and also to indicate as part of that PCC rule that the subscriber has no Premium packed for that video application and also to pass the UE screen size. In general, there are two options here. First, a predefined PCC rule for video (thus having no impact on the Gx interface, new local PCEF parameters need to be supported to indicate the above items). And second, a dynamic PCC rule (with ADC as described above) for video including new attribute value pairs (AVPs) (a Premium AVP and a Screen-Size AVP, this one including a Height AVP and a Width AVP).

Figure 6B:
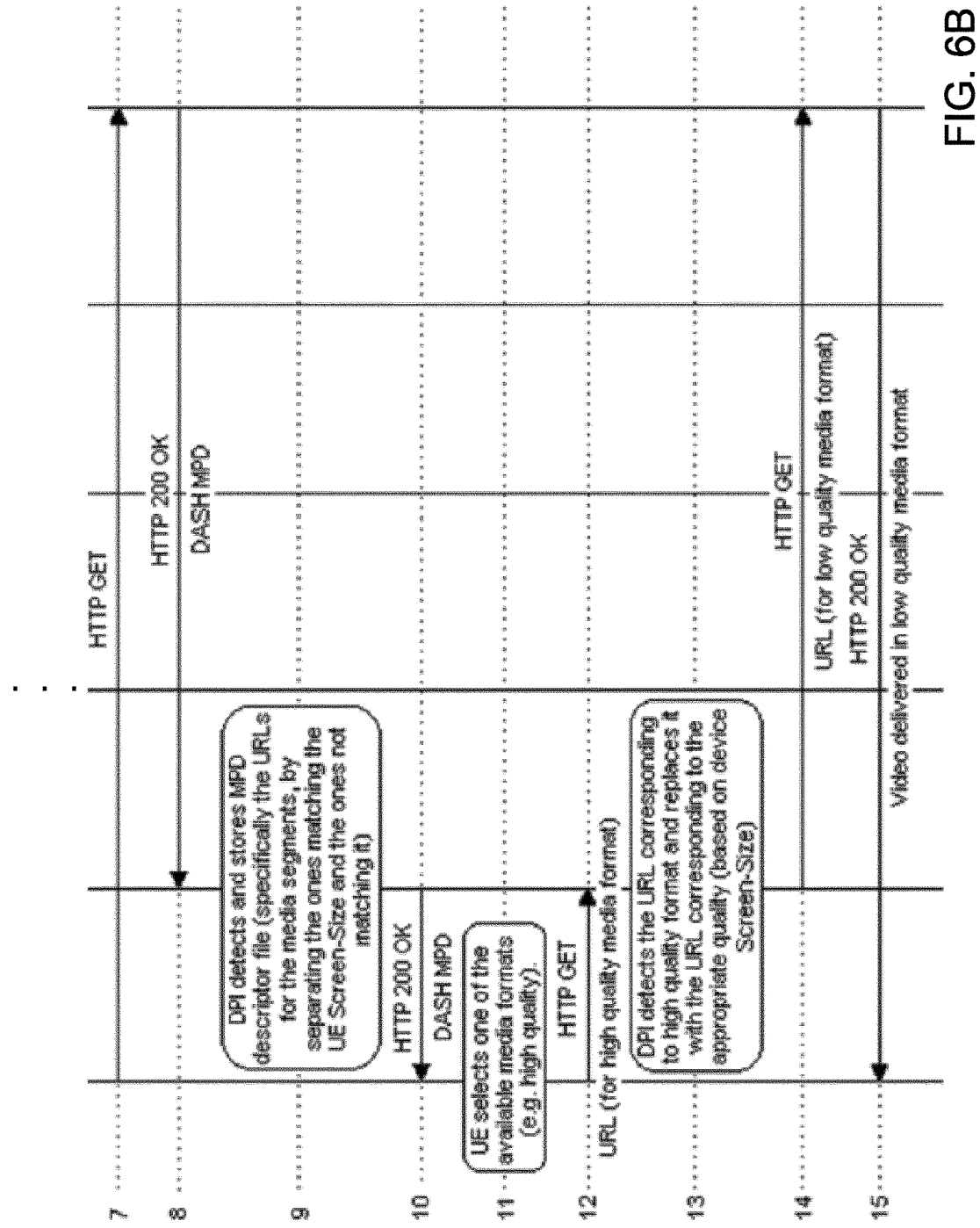

When, according to Steps 7, 8, and 9 of FIG. 6B, the UE 10 starts HTTP ABR video, e.g. by triggering a HTTP GET request message to a ".mpd" file (i.e., a DASH video), the PCEF node 20 (with DPI capabilities) will perform the following actions:

The DPI function of the PCEF node 20 will identify HTTP ABR video (in this case, according to the DASH protocol) and classify it according to the active PCC rules.

The DPI function of the PCEF node 20 will identify/detect the MPD descriptor file included in the HTTP 200 OK response message (here, for example, the descriptor file is part of the HTTP payload included in content-type=application/dash+xml as a text file. This file is usually distributed into different IP packets and TCP segments and thus the DPI may have to perform IP fragments reassembly, which is a known technique), and store the descriptor file (specifically, for example, the URLs for the media segments, by separating the ones matching the UE screen size and the ones not matching it). Here, the PCEF node 20 will parse the text file (descriptor file) to detect the different media characteristics (codecs, bandwidths, screen width, screen height, etc.) and their corresponding identifiers (such URLs or identification numbers), i.e. to detect the above-described association between a plurality of identifiers and corresponding characteristics. Specifically, for the different video representations/characteristics in the MPD descriptor file, the PCEF node 20 compares their respective widths and heights with the width and height as received from the PCRF node 40 in the Screen-Size AVP (in Step 5 of FIG. 6A), in order to select the best matching option.

The following is an example of the relevant part of the MPD descriptor file obtained from a real DASH video trace. In this example, the best matching option will be the first representation since the UE screen sizes correspond to the UE screen sizes as received in step 5 described above. The DPI function of the PCEF node 20 will then store all the Representation IDs and tag each of them as matching ("video=412000") or not matching ("video=823000", "video=2070000").

```
<Representation
    ID="video=412000"
    bandwidth="412000"
    codecs="avc1.42C014"
    width="400"
    height="224"
    sar="199:200">
</Representation>
<Representation
    ID="video=823000"
    bandwidth="823000"
    codecs="avc1.42C01E"
    width ="704"
    height="396">
</Representation>
<Representation
    ID="video=2070000"
    bandwidth="2070000"
    codecs="avc1.42C01F"
    width="1280"
    height="720">
</Representation>
```

According to Step 10 of FIG. 6B the PCEF node 20 will subsequently forward the 200 OK response to the UE 10 with no modification, in particular no modification to the MPD descriptor file.

According to Steps 11 and 12 of FIG. 6B the UE 10 will then select one of the available media formats (e.g. high quality) and trigger an HTTP GET request message to the corresponding URL (identifier), as defined in the MPD descriptor file.

According to Steps 13 and 14 of FIG. 6B the PCEF node 20 by using DPI capabilities, as described above, will detect the requested URL in the HTTP GET message. Further, in a case that the detected URL does not match with any of the stored Representation IDs (identifiers) in the MPD descriptor file ("video=41200", "video=823000", "video=2070000"), it will forward the HTTP GET request message unmodified. Further, in a case that the detected URL does match with any of the stored Representation IDs in the MPD, the following procedure is adapted:

In a case the detected URL matches with a Representation ID tagged as matching, the PCEF node 20 will forward the HTTP GET request message unmodified.

In case the detected URL matches with a Representation ID tagged as NOT matching, the PCEF node 20 will replace the original received URL with the URL corresponding to the Representation ID tagged as matching, as indicated in the following example:

Original HTTP GET:
GET http://live.unified-streaming.com/loop/loop.isml/loop-video=2070000-7453160.dash HTTP/1.1\r\n
Modified HTTP GET:
GET http://live.unified-streaming.com/loop/loop.isml/loop-video=412000-7453160.dash HTTP/1.1\r\n This replacement may be based, for example, on string matching. Alternatively, the replacement may be based on a correspondence between the Representation IDs (obtained from the descriptor file) and how these are coded into the URL which depends basically on the specific HTTP ABR video protocol. Here, for example, the PCEF/TDF node may detect which HTTP ABR video protocol is used (from the descriptor file format) and based on that, it will parse the URL to identify where the Representation ID is to be expected, and it may insert the appropriate Representation ID in case it needs to be updated.

According to Step 15 of FIG. 6B, responsive to the modified HTTP GET request message received in Step 14, the HTTP Video Server 30 will deliver video according to the characteristics/format selected (e.g. low quality).

It may also be possible that during the IP-CAN session, and based on PCRF policies, the PCRF node 40 decides to indicate to the PCEF/TDF node 20 to modify the behaviour by means of updating the PCC rules. Following the example above, if the user now subscribes to the Premium video package (during the IP-CAN session), the PCRF node 40 will indicate through PCC rules that the subscriber is now a Premium video subscriber.

In the following a further embodiment is described for the scenario of the network node 20 being a PCEF node with DPI capabilities. This scenario also equally applies for the network node being a TDF node. More specifically, FIGS. 7A and 7B (continuation) illustrates a flow diagram for QoS metrics activation used in a communications network comprising a UE 10, a PCED node (with DPI capabilities) 20, a PCRF node 40, a SPR node 50, an analytics server 70, and a HTTP video server 30 which are in communication interaction to implement this scenario.

While the detailed procedure described below refers to the DASH protocol as defined in 3GPP TS 26.247 (V13.0.0) and Chapter 10 titled "QoE for Progressive Download and DASH", which defines a mechanism for the UE to provide QoE reports for video delivered through DASH protocol to the web server, it is noted that the general concept described below may readily be generalized to any other video delivery protocol supporting QoE metric reports.

Figure 7A:
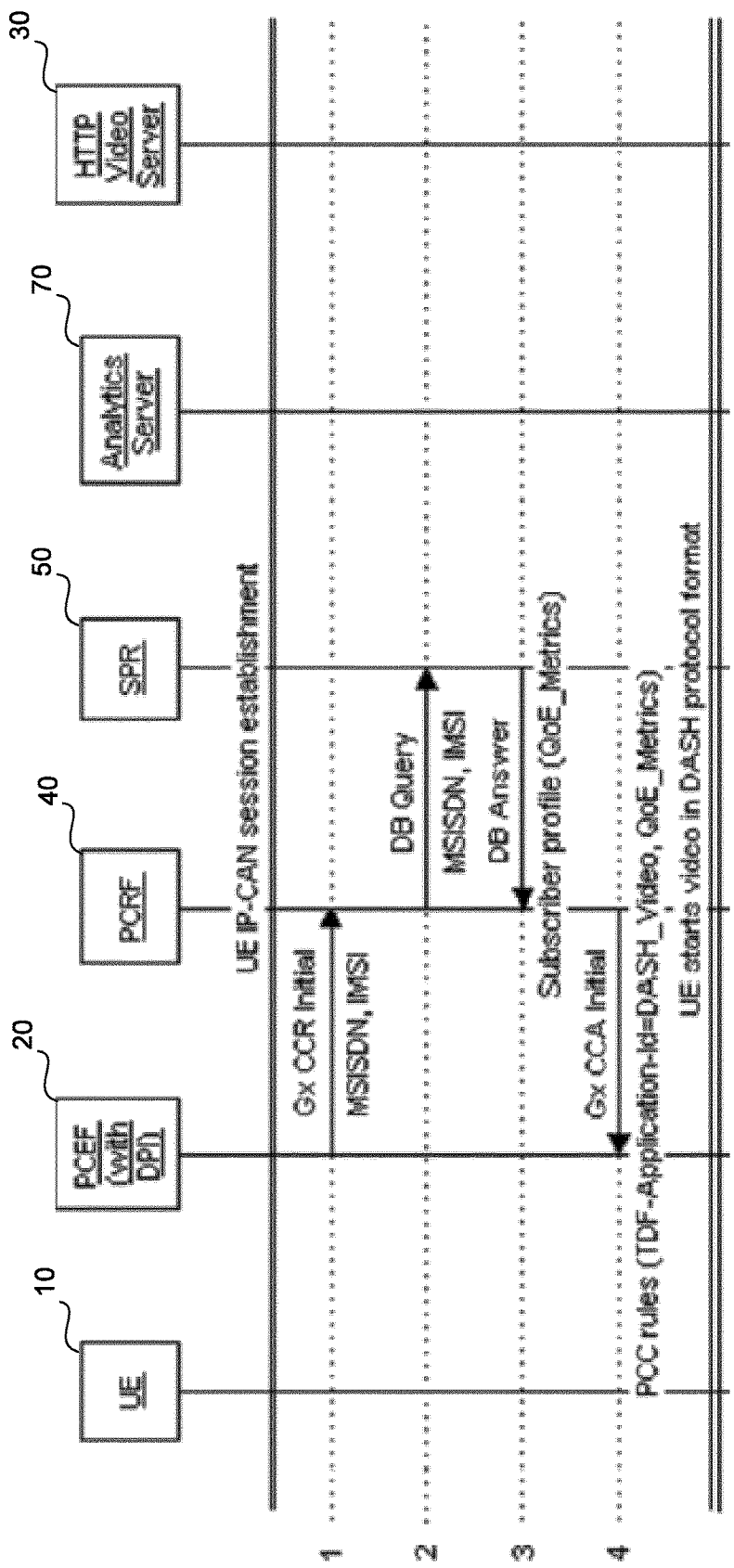
FIGS. 7A and 7B (continuation) is a schematic flow diagram illustrating another embodiment of a method in a communications network.

In Step 1 of FIG. 7A, at IP-CAN session establishment (PDP context creation here, in case of 3G networks), the PCEF node 20 (e.g., a GGSN node) will convey to the PCRF node 40 the subscriber identity (IMSI or MSISDN) in the Gx initial CCR message.

According to Steps 2 and 3 of FIG. 7A, based on the received subscriber identity (IMSI or MSISDN), the PCRF node 40 will perform a query to retrieve the subscriber's profile from the SPR database 50, which in this case indicates (in the subscriber profile) that this user is subject to video QoE metrics reports (e.g. in case the user has complained about video quality).

According to Step 4 of FIG. 7A, based on a Gx initial CCA message the PCRF node 40 will install in PCEF node 20 the corresponding PCC rules, specifically the PCC rule for HTTP ABR video (here, the DASH protocol), and also indicating as part of that PCC rule that the subscriber is subject to video QoE metrics reports. In general, there are two options here. First, a predefined PCC rule for video (no impact on the Gx interface, new local PCEF parameters need to be supported to indicate the above items). And second, a dynamic PCC rule (with ADC) for video including new AVPs (QoE_Metrics AVP).

Figure 7B:
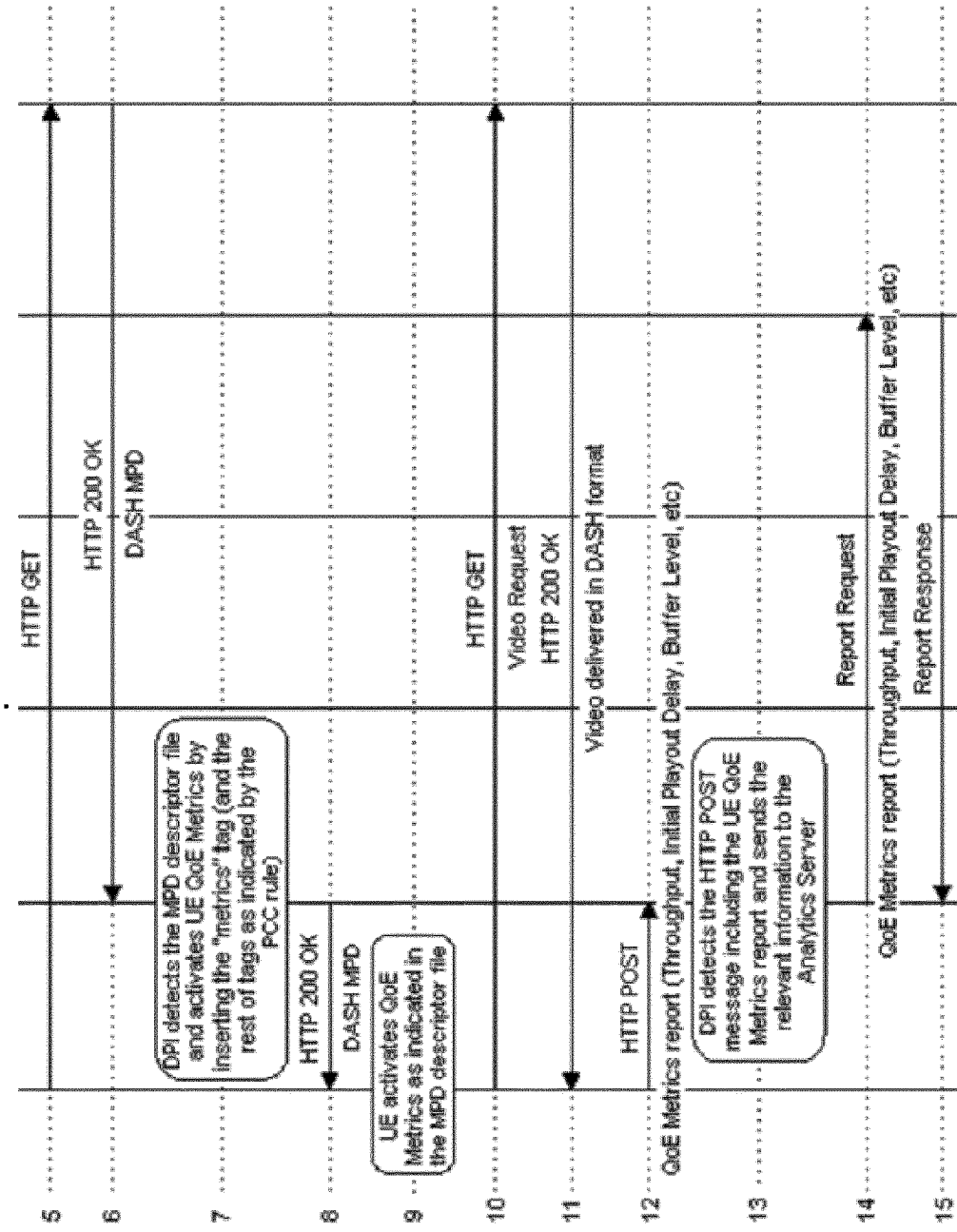

When, according to Steps 5, 6, and 7 of FIG. 7B, the UE 10 starts HTTP ABR video, e.g. by triggering a HTTP GET request message to a ".mpd" file (i.e., a DASH video), the PCEF node 20 (with DPI capabilities) will perform the following actions:

The DPI function of the PCEF node 20 will identify HTTP ABR video (in this case, DASH protocol) and classify it according to the active PCC rules.

The DPI function of the PCEF node 20 will then identify the MPD descriptor file included in the HTTP 200 OK response (as HTTP payload included in content-type=application/dash+xml). The PCEF node 20 will modify the MPD descriptor file as follows. In particular, the PCEF node 20 will add/insert a "metrics" tag and also add/insert the specific metrics of interest ("MetricsType") as indicated by the PCC rule, e.g. throughput, number of changes of video representation, initial playout delay, buffer level, etc. In addition, the PCEF node 20 may configure the QoE reporting interval by adding a specific tag in the MPD file (by default reporting only happens when video is finished).

According to Step 8 of FIG. 7B, the PCEF node 20 will forward the 200 OK response to the UE with the MPD descriptor file modified as indicated above, i.e. including a "metrics" tag and also including the specific metrics.

According to Step 9 of FIG. 7B, the UE 10 will retrieve the MPD descriptor file and activate the QoE metrics accordingly.

According to Step 10 of FIG. 7B, the UE 10 will select one of the available media formats and trigger an HTTP GET message, as described above in Step 12 of FIG. 6B. The PCEF 20 node may subsequently perform the Steps 13 and 14 of FIG. 6B, as described above.

Subsequently, according to Step 11 of FIG. 7B, the Video Server 30 will deliver the requested video segment in a 200 OK message.

According to Step 12 of FIG. 7B, the UE 10 will periodically trigger an HTTP POST message including QoE metric reports (e.g., including throughput, number of changes of video representation, initial playout delay, buffer level, etc.).

According to Steps 13 and 14 of FIG. 7B, the PCEF node 20 (with DPI capabilities) will detect the HTTP POST message including content-type "application/3gpdash-qoe-report+xml", i.e. the UE QoE metrics report and sends the QoE metric reports to the Analytics Server 70 by triggering a Report Request message.

It is noted that the Report Request message indicated in Step 14 of FIG. 7B may either contain the raw report sent from the UE 10 in Step 12 of FIG. 7B (included in HTTP POST message) or may be pre-processed by the PCEF/TDF node 20, e.g. to report only when a certain QoE metric is below a configured threshold.

As an alternative to the above described procedure, instead of forwarding the report to an Analytics Server node, another alternative would be to send it to the PCRF node 40 (by means of extensions of Gx/Sd protocol).

Finally, the Analytics Server node 50 may be provided appropriate capabilities to process the raw QoE metric reports included in the HTTP POST message. Another alternative would be to force the UE 10 to send the QoE metric reports directly to the Analytics Server (instead of the Video Server). In order to achieve that, in Step 7 of FIG. 7B above, the PCEF/TDF node 20 may further add in the MPD descriptor file the Analytics Server URL (by adding the "@reportingserver" tag). In this case, the above Steps 13, 14 and 15 of FIG. 7B would not be needed, so this results in a simpler alternative.

The above respective modules may be implemented by a processing unit that includes one or a plurality of processors, a microprocessor or other processing logic that interprets and executes instructions stored in a main memory. The main memory may include a RAM or other type of dynamic storage device that may store information and instructions for execution by the respective modules. For example, the communication module and/or the processing module discussed above with respect to FIG. 3 may be realized by the processing unit. The ROM may include a ROM device or another type of static storage device that may store static information and instructions for use by the processing unit.

As mentioned above, the UE 10 and the network nodes 20 and 40 may perform certain operations or processes described herein. The UE 10 and the network nodes 20 and 40 may perform these operations in response to the processing unit executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

The software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules of the wireless device 10 and the nodes 20 and 40 and systems may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operation, which may be stored as instructions in the memory, are carried out.

Further, the elements/modules/units of the nodes or systems may be implemented in hardware, software, Field Programmable Gate Arrays (FPGAs), Application-Specific Integrated Circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

ABBREVIATIONS

ABR Adaptive Bit Rate
DASH Dynamic Adaptive Streaming over HTTP
DPI Deep Packet Inspection
HDS HTTP Dynamic Streaming
HLS HTTP Live Streaming
HTTP Hyper Transfer Text Protocol
IMEI International Mobile Equipment Identity
IMSI International Mobile Subscriber Identity
MPD Media Presentation Description
MSISDN Mobile Station Integrated Services Digital Network
MSS Microsoft Smooth Streaming
PCC Policy and Charging Control
PCEF Policy and Charging Enforcement Function
PCRF Policy and Charging Rules Function
QoE Quality of Experience
QoS Quality of Service
TDF Traffic Detection Function
UE User Equipment (user terminal)

The invention claimed is:

1. A method in a network node being in communication interaction with a user terminal, UE, and a media server, the method comprising:
performing a deep packet inspection, DPI, on IP packets sent from the media server to the UE to detect:
a plurality of media stream identifiers; and
characteristics of respective different media streams associated with the plurality of media stream identifiers, the different media streams representing the same media information;

performing a DPI on IP packets sent from the UE to the media server to detect a media stream identifier selected by the UE from the plurality of media stream identifiers, the IP packets corresponding to a request to obtain one of the different media streams; and modifying the request by replacing the detected media stream identifier selected by the UE with any other of the media stream identifiers from the plurality of media stream identifiers.

2. The method according to claim 1, wherein the modifying step is performed based on policies one of configured in the network node and received in the network node from a policy and charging rules function, PCRF, node.

3. The method according to claim 2, wherein the modifying step is conducted if the detected media stream identifier selected by the UE does not match a specific media stream identifier as indicated based on the policies.

4. The method according to claim 2, wherein the policies are defined based on at least one of a UE screen size, a subscriber type, a network congestion status information, and a UE location.

5. The method according to claim 4, wherein the UE screen size is retrieved via a PCRF access to a database storing information in relationship with the international mobile equipment identity, IMEI, of the UE.

6. The method according to claim 1, wherein the detection of the association further comprises identifying a descriptor file and parsing the descriptor file for detecting the plurality of characteristics for the association.

7. The method according to claim 6, further comprising comparing the detected plurality of characteristics in the descriptor file with a specific characteristic defined in said policies, and selecting a best matching option.

8. The method according to claim 7, further comprising tagging the detected association based on the selected best matching option.

9. The method according to claim 2, wherein the policies comprise one selected from the group consisting of a policy and charging control, PCC, rule and an application detection and control, ADC, rule.

10. The method according to claim 1, wherein the request is a HTTP GET request message.

11. The method according to claim 1, further comprising:
activating a UE Quality of Experience, QoE, metrics reporting; and
detecting a UE QoE metrics report received from the UE and sending the UE QoE metrics report to one of an analytics server and a policy and charging rules function, PCRF, node.

12. The method according to claim 1, wherein the network node is one of a network node having a traffic detection function, TDF, and a network node having a policy and charging enforcement function, PCEF, enhanced with the DF.

13. A network node being in communication interaction with a user terminal, UE, and a media server, the network node comprising:
a processor and a memory storing instructions, which when executed by the processor, cause the processor to:
perform a deep packet inspection, DPI, on IP packets sent from the media server to the UE to detect:
a plurality of media stream identifiers; and
characteristics of respective different media streams associated with the plurality of media stream identifiers, the different media streams representing the same media information; and perform a DPI on IP packets corresponding to a request from the UE to the media server to obtain one of the different media streams and to detect a media stream identifier selected by the UE from the plurality of media stream identifiers; and
modify the request by replacing the detected media stream identifier selected by the UE with any other of the media stream identifiers from the plurality of media stream identifiers.

14. The network node according to claim 13, wherein the processor is further configured to modify the request based on policies one of configured in the network node and received in the network node from a policy and charging rules function, PCRF, node.

15. The network node according to claim 14, wherein the processor is further configured to conduct the request modification if the detected media stream identifier selected by the UE does not match a specific media stream identifier as indicated based on the policies.

16. The network node according to claim 13, wherein the policies are defined based on at least one of a UE screen size, a subscriber type, a network congestion status information, and a UE location.

17. The network node according to claim 16, wherein the UE screen size is retrieved via a policy and charging rules function, PCRF, access to a database storing information in relationship with the international mobile equipment identity, IMEI, of the UE.

18. The network node according to claim 13, wherein the processor is further configured to identify a descriptor file and to parse the descriptor file for detecting the plurality of characteristics for the association.

19. The network node according to claim 18, wherein the processor is further configured to compare the detected plurality of characteristics in the descriptor file with a specific characteristic defined in the policies, and to select a best matching option.

20. The network node according to claim 19, wherein the processor is further configured to tag the detected association based on the selected best matching option.

21. The network node according to claim 13, wherein the policies comprise one selected from the group consisting of a policy and charging control, PCC, rule and an application detection and control, ADC, rule.

22. The network node according to claim 13, wherein the request is a HTTP GET request message.

23. The network node according to claim 13, wherein the processor is further configured to:
activate a UE Quality of Experience, QoE, metrics reporting; and
detect a UE QoE metrics report received from the UE and to send the UE QoE metrics report to one of an analytics server and a policy and charging rules function, PCRF, node.

24. A system comprising:
a network node being in communication interaction with a user terminal, UE, and a media server, the network node comprising:
a processor and a memory storing instructions, which when executed by the processor, cause the processor to:
perform a deep packet inspection, DPI, on IP packets sent from the media server to the UE to detect
a plurality of media stream identifiers; and
characteristics of respective different media streams associated with the plurality of media stream identifiers, the different media streams representing the same media information; and perform a DPI on IP packets corresponding to a request from the UE to obtain one of the different media streams of the plurality of media stream identifiers and sent from the UE to the media server to detect a media stream identifier selected by the UE from the plurality of media stream identifiers; and modify the request by replacing the detected media stream identifier selected by the UE with any other of the media stream identifiers of the plurality of media stream identifiers; and a policy and charging rules function, PCRF, node.

25. A non-transitory computer storage medium storing a computer program including instructions configured, when executed on at least one data processor, causes the at least one data processor to execute a method in a network node being in communication interaction with a user terminal, UE, and a media server, of:

performing a deep packet inspection, DPI, on IP packets sent from the media server to the UE to detect:

a plurality of media stream identifiers; and characteristics of respective different media streams associated with the plurality of media stream identifiers, the different media streams representing the same media information;

performing a DPI on IP packets sent from the UE to the media server to detect a media stream identifier selected by the UE from the plurality of media stream identifiers, the IP packets corresponding to a request to obtain one of the different media streams; and modifying the request by replacing the detected media stream identifier selected by the UE with any other of the media stream identifiers from the plurality of media stream identifiers.

* * * * *